(12) United States Patent
Reiter (10) Patent No.: US 10,578,429 B2
(45) Date of Patent: Mar. 3, 2020

(54) SHAPE DETERMINATION METHOD

(71) Applicant: SmartRay GmbH, Wolfratshausen (DE)

(72) Inventor: Mathias Reiter, Hohenschäftlarn (DE)

(73) Assignee: SmartRay GmbH, Wolfratshausen (DE)

( * ) Notice: Subject to any disclaimer, the term of this patent is extended or adjusted under 35 U.S.C. 154(b) by 0 days.

(21) Appl. No.: 16/060,806

(22) PCT Filed: Dec. 9, 2016

(86) PCT No.: PCT/EP2016/080391
§ 371 (c)(1),
(2) Date: Jun. 8, 2018

(87) PCT Pub. No.: WO2017/097959
PCT Pub. Date: Jun. 15, 2017

(65) Prior Publication Data
US 2018/0364034 A1  Dec. 20, 2018

(30) Foreign Application Priority Data

Dec. 11, 2015  (DE) .......... 10 2015 121 673

(51) Int. Cl.
  *G01B 11/24* (2006.01)
  *G01B 11/25* (2006.01)
  *G06T 3/40* (2006.01)
(52) U.S. Cl.
  CPC .......... *G01B 11/2518* (2013.01); *G01B 11/25* (2013.01); *G06T 3/40* (2013.01)

(58) Field of Classification Search
  CPC ....... G01B 11/04; G01B 11/24; G01B 11/255; G01B 11/2518
  USPC .................................. 356/601–623; 382/154
  See application file for complete search history.

(56) References Cited

U.S. PATENT DOCUMENTS

| 6,233,049 B1 | 5/2001 | Kondo et al. |
| 6,728,423 B1* | 4/2004 | Rubbert .................... A61C 7/00 |
| | | 356/601 |
| 8,970,853 B2* | 3/2015 | Takabayashi .......... G01B 11/25 |
| | | 356/610 |
| 2002/0060795 A1 | 5/2002 | Metcalfe et al. |
| 2007/0285672 A1* | 12/2007 | Mukai ................ G01B 11/2518 |
| | | 356/603 |

(Continued)

FOREIGN PATENT DOCUMENTS

| DE | 102006036586 A1 | 2/2008 |
| DE | 102008010965 | 8/2009 |

(Continued)

*Primary Examiner* — Hoa Q Pham
(74) *Attorney, Agent, or Firm* — Head, Johnson, Kachigian & Wilkinson, PC (57) ABSTRACT

In order to quickly determine three-dimensional contours, for example, in real time for industrial processes, capturing and processing data, a method includes a step of initially determining a coarse position of a light line image by a position scan with reduced resolution and therefrom automatically defining windows on a sensor which include an entire line image so that the data only has to be read from the windows during the subsequent measuring scan which is performed with a higher resolution compared to the position scans.

16 Claims, 7 Drawing Sheets

(56) References Cited

U.S. PATENT DOCUMENTS

| | | | | |
|---|---|---|---|---|
| 2010/0195114 A1* | 8/2010 | Mitsumoto | ........ | G01B 11/245 |
| | | | | 356/601 |
| 2012/0019836 A1* | 1/2012 | Honma | ............ | G01B 11/2522 |
| | | | | 356/603 |
| 2012/0113435 A1* | 5/2012 | Suzuki | .............. | G01B 11/2518 |
| | | | | 356/612 |
| 2012/0218562 A1* | 8/2012 | Ogino | ............... | G01B 11/0608 |
| | | | | 356/610 |

FOREIGN PATENT DOCUMENTS

| | | |
|---|---|---|
| DE | 102012015605 A1 | 3/2013 |
| DE | 102012104745 A1 | 12/2013 |
| DE | 102014107143 A1 | 12/2014 |
| EP | 1780502 | 5/2007 |

* cited by examiner

SHAPE DETERMINATION METHOD

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

I. FIELD OF THE INVENTION

The invention relates to 3D-shape determination.

II. BACKGROUND OF THE INVENTION

Capturing data defining a shape of 3-dimension contours, in particular of protrusions on base surfaces that are substantially flat is often required in industrial applications in order to perform quality control upon protrusions that have been fabricated in a defined manner like, e.g., glue points, glue beads, welds, coatings, etc.

Determining shape data or other specifying data that relates to a surface shape, e.g., of a volume of a protrusion is typically performed by a light section method.

Thus, a fanned light beam that is only fanned in one plane shines onto a surface to be examined and detected at an angle, typically an acute angle, to a direction of irradiation so that a shape of an image of the fanned beam on the surface facilitates detecting protrusions on the surface since the detected image shows a rise when the light beam fan that impacts in a line runs transversely over the protrusion.

Individual images of the light line on the object are captured in great numbers with short time intervals in between while the object moves in a transversal direction relative to the light line, so that its three-dimensional surface shape can be determined by sequentially assembling the individual elevation scans and/or parameters like height, volume, width, position of the protrusions associated therewith.

The typically artificially created protrusions shall be typically detected during a fabrication process of an object so that a very high detection speed and processing speed of this contour determination is required when, for example, the object runs with a speed of 600 m/min under the light line. When the detecting is performed, for example, by an off-the-shelf surface scanner with 512×512 pixels at 30 Hz thus 30 scans per minute, almost 8 million data sets have to be processed per second presuming only one data set per pixel. A data set, however, includes at least two individual data fields (position and light intensity), sometimes even more.

Accordingly, a minimum time between the individual scans caused by the optical sensor as well as the processing speed of the image data thus determined by the subsequent electronic processing unit can be a limiting factor.

The minimum time between the individual scans is a sum of an exposure time of the sensor that is always required and essentially always has the same length and a time period required for reading the image data from the optical sensor into the subsequent processing unit, wherein the reading time depending on the sensor type can be a function of a number of data sets read out, thus pixels read out.

In this context various types of flat optical sensors have to be differentiated:

For all flat optical sensors, it can be determined before starting the reading that only the image data of particular lines and/or columns of the typically grid arranged pixels of the flat optical sensor shall be read or also only the image data of reading windows within the sensor surface is predetermined before the reading, in particular before capturing the image wherein the reading windows are predetermined by line numbers and/or column numbers.

For particular sensor types it is possible to start reading the image data at one of the ends of a line shaped image of the light line which extends e.g., approximately in line direction and to initially predetermine and sequentially read only a relatively small portion of the window portion of the image data that extends transversely to the image as a function of a predetermined position and orientation of a beginning of the image, namely a portion in which the image will most likely be arranged as a function of a position in the preceding window portions.

Both facilitates keeping a volume of image data to be read out at an optimum low level for each scan, however, the latter sensor type is typically not available or not available with the desired parameters and has other disadvantages.

The processing speed of the read image data is a function on the one hand side of a data volume to be processed and on the other hand side a function of a type of processing operations and their number.

Ideally a time for processing a data volume of a scan is as short or shorter than a minimum time between individual scans or at least a minimum time that is predetermined by the processing process between sequential data writing operations of the individual scans into the processing unit is as short or shorter than the minimum time between the scans in that processing the read image data is performed sequentially so that a time requirement for individual processing steps is respectively arranged below a minimum time between the scans.

The scan frequency thus generated shall be high enough eventually so that individual scans on the object are performed with a short spatial distance between each other for a maximum running speed of the object to be scanned, thus e.g. the production machine a quasi-seamless checking of surface data that is of interest is facilitated.

Using the example of controlling a glue bead that is applied to a surface in a continuous process a scan is performed along the glue bead every millimeters and determines which height, width and/or cross-sectional surface the glue bead had at each individual scan.

In spite of different consistency of the glue and of inertia of nozzles applying the glue bead it is assured that no voids can occur in the glue bead which can influence a subsequent quality of the glue joint.

III. BRIEF SUMMARY OF THE INVENTION a) Technical Object

Thus, it is an object of the invention to achieve a maximum scanning sped in particular for flat sensors which facilitate or require for selective reading of data only from reading windows predetermined on the sensor that all windows are predetermined before the scan is performed, thus an image is taken by the sensor.

b) Solution

The object is achieved by the features of claims 1 and 15. Advantageous embodiments can be derived from the dependent claims.

Improving upon the known method for touch free determination of surface data of a three dimensional surface contour of objects by the light section triangulation method in that a light line is applied to the contour by a fan shaped light beam and a picture is taken by a flat sensor at a different viewing angle wherein the picture generates a line image on the flat sensor which facilitates determining a 3 dimensional curve of the light line on the object from a known arrangement of all components involved and wherein an entire surface contour of the object can be determined from a plurality of light lines and line images placed adjacent to each other.

The basic idea of the method according to the invention is to read only a portion of the image data from the optical sensor for the measuring scan. Thus, the reading time is reduced and thus the minimum time between 2 sequential scans and in particular the data volume to be processed is reduced which reduces a time requirement for the entire subsequent data processing.

In this context it is already known to predetermine reading windows on the flat sensor wherein the reading windows adjoin each other or overlap each other slightly and are arranged and sized so that the line image of the light line is entirely within a window portion formed by the windows and to merely read the image data from the window portion thus of the surface of the flat sensor defined by the sum of the windows.

However, the known solutions have the following disadvantages:
  either the windows for each subsequent scan are defined based on the preceding scan and the determined position of the line image on the sensor,
  or for a new scan a position is determined at one end of the line image, the first window is defined at this location and based on the extension direction of the line image determined in the first window the subsequent window is predetermined with respect to size and position one after the other, advantageously only during the reading process which however causes a rather high amount of computation and thus costs time.

Another disadvantage of this method is that illuminated portions that are provided in addition to the line image on the sensor remote from the line image are not detected, in particular when the line image is continuously provided without a gap and determining correct windows for the next scan is very problematic when a gap occurs in the light line.

Thus, the method according to the invention proceeds so that it is initially determined where illuminated portions, thus an image is provided on the sensor which can be image portions even in addition to a continuous line image due to reflections or other particularities which however shall be detected.

For this purpose, a so-called position scan is performed in order to determine all illuminated surfaces that are provided on the sensor with respect to position and advantageously also with respect to shape. This position scan is not used as a measuring scan; thus, it is not included in the resultant data which reflect a contour of the work piece surface that is to be determined.

Based on the position that is determined during the position scan, thus in particular the extension, but also the shape, in particular the width of the line image the reading windows for the subsequent measuring scan are automatically determined so that they adjoin each other in particular in an extension direction of the line image and advantageously overlap and wherein this window portion in total includes the entire line image.

For the position scan data of an entire surface of the sensor is captured, however it is being attempted to accelerate the data volume and/or the processing process e.g. as follows.

A first method is performing the position scan with a smaller resolution than the measuring scan.

Typically brightness values and certainly positions of all pixels on the sensor are read from the predetermined portions during the measuring scan, and for a reduced resolution for the position scan the brightness values of all pixels are not read out but only brightness values of a portion of the pixels which still reflect the position, thus in particular the extension and shape of the line image with sufficient precision, at least with sufficient precision in order to determine the reading windows for the data that is still to be read for the at least one subsequent measuring scan based thereon automatically.

A first variant includes combining the directly adjacent pixels into a pixel group and treating them as a single virtual pixel. In particular four pixels that are typically arranged in a square grid relative to each other and jointly form a square can be combined into a single virtual pixel or also the sixteen pixels which are arranged in a square with four pixels edge length.

As a position of the virtual pixel e.g., a center of the combined pixel group thus of the squares can be used but also the position of the pixel with the highest brightness value within the pixel group.

For a brightness value of the virtual pixel, e.g., a mean of the brightness value of all pixels of the pixel group can be used or also the sum of the brightness values of all pixels of the pixel group can be selected or also the highest value within the pixel group for a brightness value that occurs on a pixel.

Since only data of the virtual pixels has to be processed, maybe even only read in case the flat sensor includes an integrated intermediary data storage and an intermediary processing device, this reduces computation complexity and thus time for determining a position of the image, in particular the line image, in particular during position scan enormously.

Since the virtual pixels are now offset on the flat sensor a gap between adjacent virtual pixels can now be closed by a straight connection line as a virtual portion of the line image in order to determine a shape of the line image.

Another variant is to set a brightness threshold higher for the position scan than for the subsequent measuring scan wherein a pixel is read beyond the threshold and the pixel is designated as an illuminated pixel.

Another variant is to read in each of the two extensions of the flat sensor thus in the row direction as well as in the column direction respectively only data of pixels that are arranged at a predetermined pixel distance from each other, thus for example each fifth and each tenth pixel, wherein the selected pixel distance can be different in both extension directions of the respective sensor, in particular when a primary shape of the line image is known overall.

For the at least one measuring scan that is subsequent to the position scan a higher resolution is used,
- e.g., predetermined according to the methods described supra, but with other boundary conditions or threshold values.
- or a predetermined multiple of the resolution used for the position scan, in particular the full resolution, thus the brightness values of all pixels of the sensor are read and used as individual image raw data.

It is important for efficiency of the method how often a position scan of this type has to be performed in addition to the measuring scans since only the data of the measuring scans contributes to the result data.

In order to be sure that not even every small unexpected illuminated portion on the sensor remain disregarded only a measuring scan will be performed after each position scan and thereafter another position scan.

Then performing the position scan and the subsequent automatic determination of the windows has to be performed particularly quickly in order to keep a time period between the individual measuring scans as small as possible, since an advance speed during scanning along the surface of the object to be checked has to be defined as a function of the time period in order to be able to perform a seamless contour determination.

In less critical applications the seamless scan does not have to be performed but plural measuring scans can be performed after each position scan building on the position scan and based on the predetermined windows, e.g., a predetermined number of measuring scans always with the same windows that are defined during the position scan.

Another method that applies in particular when additional illuminated portions are not to be expected on the surface sensor remote from the line image wherein the method includes the step of checking after each measuring scans whether the measuring scans has produced a seamless line image or not.

If the line image of the last measuring scan has included a gap the following is now performed before the next measuring scan:
- either a position scan,
- or windows which were affected by the predetermined gap in the line image are enlarged to an entire extension of the sensors in an extension direction of the sensor which is primarily oriented transversal to the orientation of the line image. The orientation of the sensor that is primarily oriented transversal to the orientation of the line image is the orientation of the sensor which has a larger intermediary angle to the extension direction of the line image at a respective edge of the gap.

For these enlarged windows then window raw data is then read from the sensor again and it is being checked whether the existing gap in the line image can be closed by the window raw data so that the missing piece of the line image was included in the enlarged windows offset from a course of the remaining line image.

If yes, another scan is performed using also the enlarged windows. If no a new position scan is performed.

In case plural measuring scans are performed in direct sequence after a position scan it is advantageously also checked and thus after the second measuring scan after a preceding position scan whether the determined line image includes a first minimum safety distance from outer edges of a window portion that results from an entirety of the predetermined windows in particular transversal to the course orientation of the line image.

The beginning and the end of the line image do not keep a safety distance in the course orientation of the line image from the edges of the window portion since the line image begins in the course orientation at a beginning thus the outer edge of the first window.

When this first minimum safety distance is maintained for the entire line image the measuring scan is used.

If not, the measuring scan is discarded, and a new position scan is performed.

A possible additional checking includes checking after each measuring scan that can yield a complete line image whether the determined line image maintains a predetermined second minimum safety distance which is advantageously greater than the first minimum safety distance again with respect to outer edges of a window portion that is generated as a sum of the predetermined windows.

If yes, the predetermined windows are also used for the next measuring scan that is generated directly after the preceding scan, thus without performing a new position scan there between.

If not the window in which the respective location with the undercut second minimum safety distance was located is expanded for the next measuring scan so that the predetermined second minimum safety distance is maintained within the window and the window portion thus modified is used for the next measuring scan.

This way plural measuring scans can often be performed sequentially after a position scan.

Also, a manner of predetermining the windows has a significant impact upon an efficiency of the method, namely the smaller the windows and the resultant window portion is while still serving the purpose, the lower an amount of data that has to be read and processed.

Advantageously the windows are rectangular, and their edges extend parallel to both main orientations of the flat sensor that are also perpendicular to each other.

Building thereon but also independently therefrom an edge length of the window can be predetermined transversal to a primary course orientation of the line image as a predetermined multiple of a width of the line image if a width of the light line image is determinable during the position scan in a main orientation of the sensor that is oriented primarily in a direction of a width of the light line image, a corresponding definition was provided supra.

Advantageously the edge length is at least 5 times, better at least 8 times, better at least 10 times a width of the light line image.

Typically, however a predetermined boundary condition includes that the flat sensor used only accepts a predetermined maximum number of windows which may be predetermined as read out portions.

Advantageously the windows are then predetermined so that a length of the sensor in the main orientation in which the line image extends primarily, thus which is arranged at a smaller of the 2 intermediary angles to the orientation of the line image is divided by the maximum number of windows and the window length thus obtained in this extension direction is in particular enlarged, e.g., by a predetermined percentage, e.g., 15% as an average window length in this orientation in order to achieve a desired overlap of the windows.

A window width in the other orientation can respectively also correspond to an average window length in the first orientation, and the windows with the respective overlap resulting from the average window length can be arranged in the first orientation.

Thus, the windows certainly have to be arranged offset in the second orientation so that the line image is completely received in the resultant window portion, in particular in view of the minimum safety distances recited supra.

Size and configuration of the windows, however, can also be varied as a function of an orientation of the line image at the respective location.

Thus, in a first step a square window with an edge length according to the predetermined average window length can be arranged at the location of the line image wherein the line image extends at an angle of 45 degrees to the two main orientations of the flat sensor that are at a right angle relative to each other.

In the adjacent sections a ratio of length to width of the window is adjusted in analogy to a change of an orientation of the line image in this portion, thus the smaller the intermediary angle of the orientation of the line image at this location to the first main orientation the greater the length of the window in this main orientation compared to a width of the window.

In cases where there is no point on the line image that is oriented at a 45-degree angle, thus diagonally to the two main orientations but the intermediary angle is always smaller or always greater over the entire course of the line image relative to one of the two main orientations the mean window length remains constant in the primary orientation of the line image for all windows, the window width however is selected greater when the intermediary angle to the first main orientation is greater than 90 degrees everywhere, smaller when the intermediary angle of the first main orientation is smaller than 90 degrees everywhere.

Another method for predetermining the windows can be performed as follows:

The line image is divided in the primary orientation into a predetermined number of sections respectively with identical length.

For each section an orientation of the section on the sensor is determined, in particular the slope angles, $\beta_1$ or $\beta_2$ of this section relative to the first main orientation and/or the second main orientation of the sensor. In the main orientation of the sensor relative to which one slope angle is smaller than the other slope angles a window that completely encloses this section of the line image is predetermined so that the edge length of the window in a direction of the main orientation of the sensor is greater by a first safety factor than a length of the section of the first line image in this direction, and in the other main orientation, the same is being performed but with a possibly different second safety factor.

For a maximum definable number of windows, the section length can be the mean window length or the average window length that is multiplied without the predetermined factor.

The section length however can also be selected as a function of a lined up predetermined number of pixels, in particular of 100 pixels, better 500 pixels, better 1000 pixels of the sensor.

With respect to the device the object is achieved in that a device in addition to the typical components, namely a laser light source, a detector arrangement with a flat optical sensor and an electronic processing for processing the image data from the optical sensor and computing the resultant data, wherein the device includes an additional optical sensor that is configured so that determining windows from which only image data shall be read is possible or required before performing the scan.

Advantageously the optical sensor is configured so that it includes an internal data memory for the image data and in particular also an internal preprocessing unit for the data in the internal data memory for computation into other data.

Internally this means that the elements are part of the sensor and form a modular unit therewith and are in particular configured as an electronic chip together with the sensor surface.

BRIEF DESCRIPTION OF THE SEVERAL VIEWS OF THE DRAWINGS

Embodiments of the invention are subsequently described in more detail with reference to drawing figures, wherein.

DETAILED DESCRIPTION OF THE INVENTION

Figure 1:
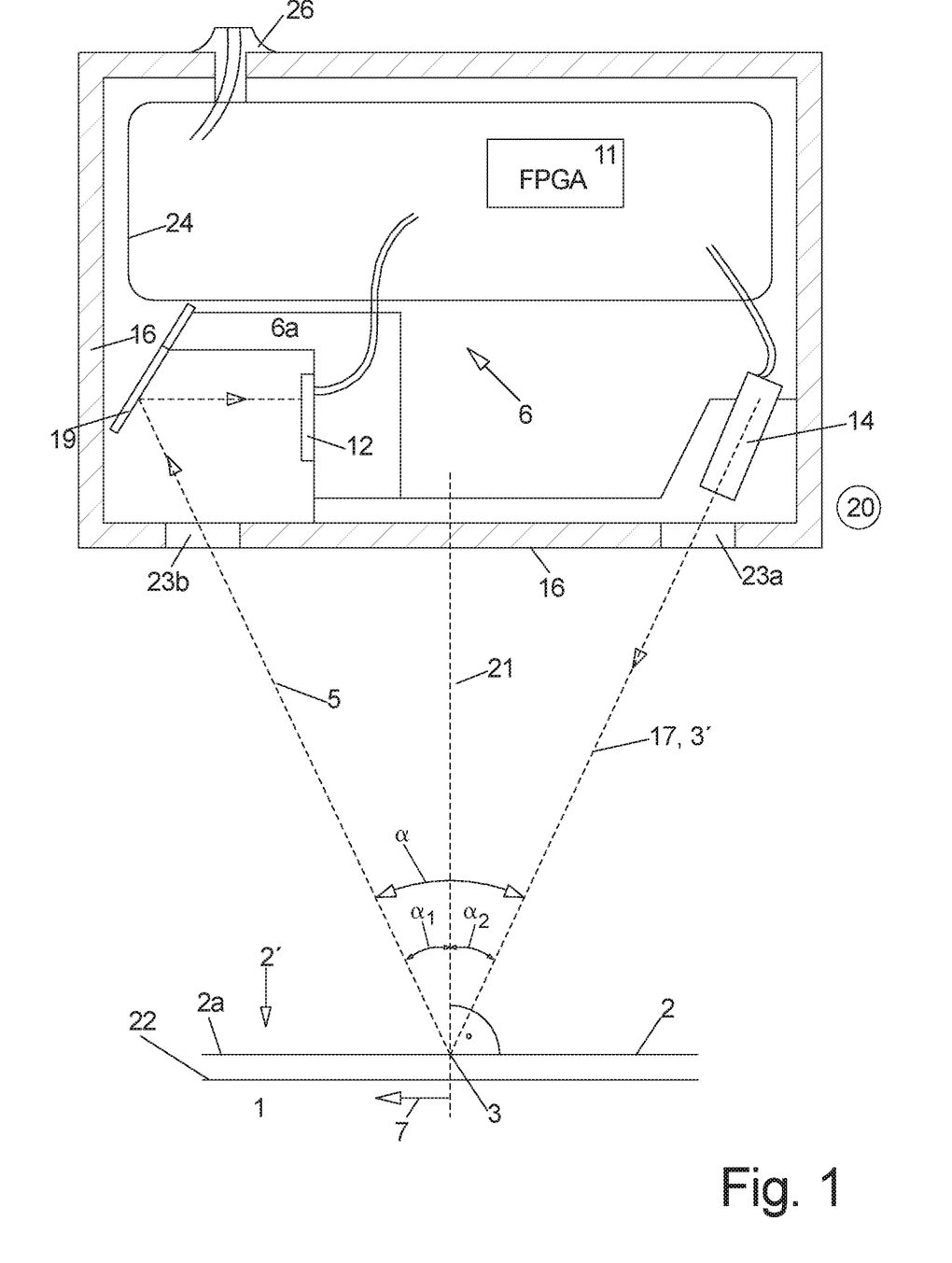
FIG. 1 illustrates a detector unit according to the invention in a sideview.

FIG. 1 illustrates a detector unit in a side view which shows how the known light section triangulation method functions in principle.

Figures 2A, 2B:
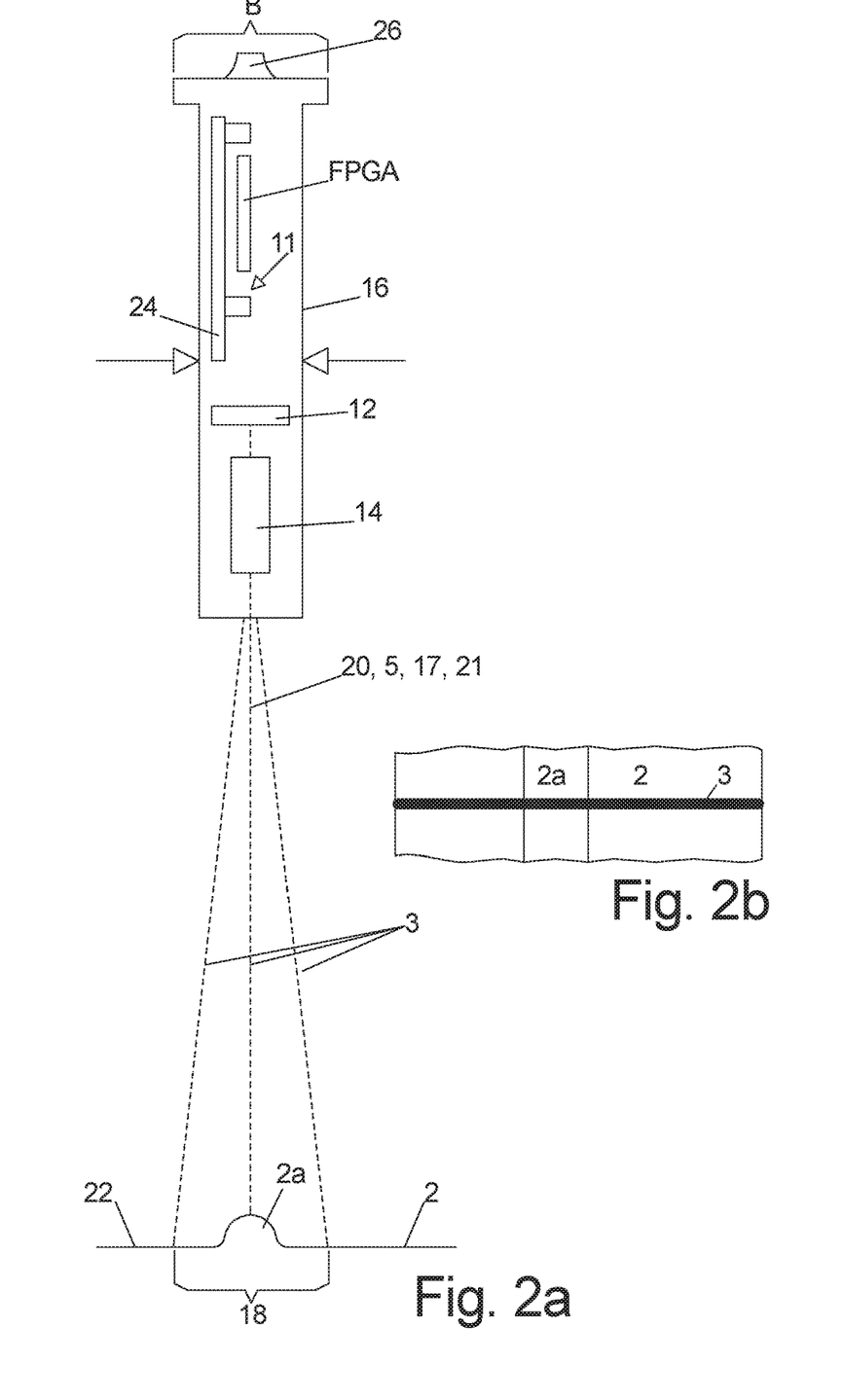
FIG. 2a illustrates the detector unit according to FIG. 1 during operations.
FIG. 2b illustrates a top view of the surface of the object.

Thus, a fan shaped light beam 3' is directed to the surface 2 of an object 1 and generates a light line 3 at this location due to the fan shape of the light beam 3' as illustrated in FIG. 2b in top view.

The line image 4 of the light line 3 that is reflected by the surface 2 of the object 1 is captured by a detector arrangement 6 which includes, e.g., a flat optical sensor 12 and an electronic processing unit 11 connected therewith for processing the image captured by the sensor 12 and computing the single image data 10 therefrom.

In order for a line image 4 to become apparent on the optical sensor 12 wherein the line image facilitates conclusions with respect to the actual contour 2' of the surface 2 at this location the radiation direction 17 of the light beam 3 and the viewing direction of the detector unit 6 must not coincide, but the radiation direction and the viewing direction 5 have to differ by a triangulation angle $\alpha$. In this embodiment the two directions are selected so that they are symmetrical on both sides of the orthogonal 21 of the surface 2, thus enclose an intermediary angle $\alpha_1 = \alpha_2$ relative to the surface 2.

An uneven surface 2, e.g., a protrusion 2a on the surface 2 in the impact area of the light beam 3' will not produce a straight light line 3 on the surface 2 and thus no straight line image 4 on the sensor 12 but a line image 4 with a convex portion wherein the convex portion of the line image 4 can differ as a function of the triangulation angle α and the separation into the intermediary angles $α_1$ and $α_2$ and from the shape of the convex portion of the contour 2 cut along the center plane between the plane of the applied light beam 3, the irradiation direction 17 and the reflection direction in which the fan shaped light line 3 is reflected, the viewing direction 5 of the sensor 12, typically an orthogonal plane.

Due to the known angles α, $α_1$ and $α_2$ and the focusing on the surface and/or knowing a distance of the detector unit 6 from the surface 2 actual dimensions of the convex section 2a on the surface 2 can be computed from the dimensions of the line image 4.

As illustrated in FIG. 1 not only the recited components of the detector arrangement 6 but also the light source 14 for generating the emitted light beam 3 are arranged together within the housing 16 of the detector unit, wherein the housing 16 is configured as a flat plane with a main plane 20 parallel to the operating plane defined by the radiation direction 17 and the viewing direction 5 and a width B transversal to the main plane 20 which is not greater than a monitoring width 18 of the fan shaped light beam 3 by which the fan shaped light beam 3 impacts the surface 2.

As illustrated in FIG. 1 the detector unit has very compact dimensions in the main plane 20 which is facilitated in that the light source 14, typically a laser cartridge, is arranged proximal to the passthrough 23a that is provided for the light beam 3' in the housing 16 and the optical sensor 12 is arranged proximal to the other passthrough 23b which are both arranged in one of the narrow sides of the housing 16 wherein a deflection of the incoming light beam, thus the viewing direction 5 is performed between the passthrough 23b and the optical sensor 12 by a mirror 19 in a direction parallel to the outer edge in which the passthrough openings 23a, b are arranged.

The sensor 12 was well as the mirror 19 are attached at a detector base element 6a which is in turn fixated at the housing 16 of the unit.

Thus, sufficient room remains on the half of the housing that is oriented away from the outside with the passthrough openings 23a, b in order to arrange a circuit board 24 at this location which circuit board is oriented in the main orientation 20 of the housing and includes the entire electronic processing unit 11 and is connected with the sensor 12 and with light source 14 through electrical conductors. The resultant data determined by the processing unit 11 are put out by a plug 26.

The individual images generated according to the light section method, the scans S1, S2 and S3 are repeated in a quick time sequence in order to continuously monitor the surface 2 of the object 1 which surface continuously moves in the movement direction 7 relative to the detector unit 6.

Since this shall be performed continuously, e.g., at a production machine for the object 1 or the convex portion 2a on the base surface 2, e.g., a glue bead on a piece of cardboard forming the base surface 2, it is necessary that the computation of the individual image data from the individual images, the scans, is performed in real time, thus the processing unit 11 has to deliver the individual image data 10 as quickly, thus in the same rhythm in which the individual images, thus the scans S1, S2, S3 are produced by the sensor.

In addition, the individual image data 10 of the scans generated in sequence also have to be assembled, in particular summed up in real time to generate the resultant data, which continuously reflect the contour 2' of the surface 2, thus in particular of the concave section 2a.

In order to achieve a fast method execution, it is attempted to reduce the data volume that is relevant for the intended result, namely a determination of predetermined geometric parameters like, e.g., height, cross sectional volume, etc., of the convex section as soon as possible and thus to minimize the amount of computation that is required for computing the resultant data.

Thus, several methods are proposed which are being used in a manner so that they supplement each other.

Figure 3A:
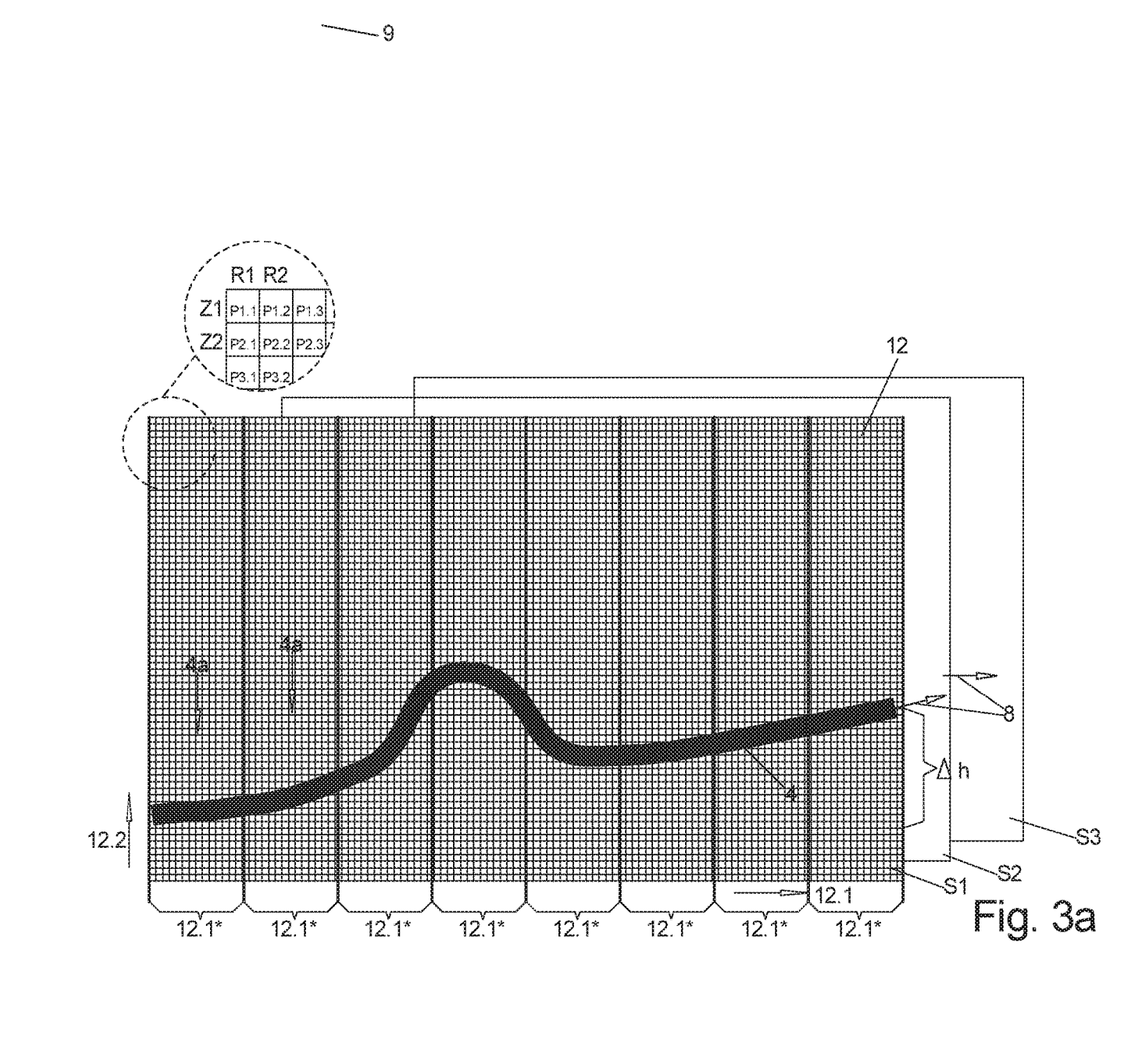
FIG. 3a-c illustrate depictions of a line image on a flat sensor.
Figure 3B:
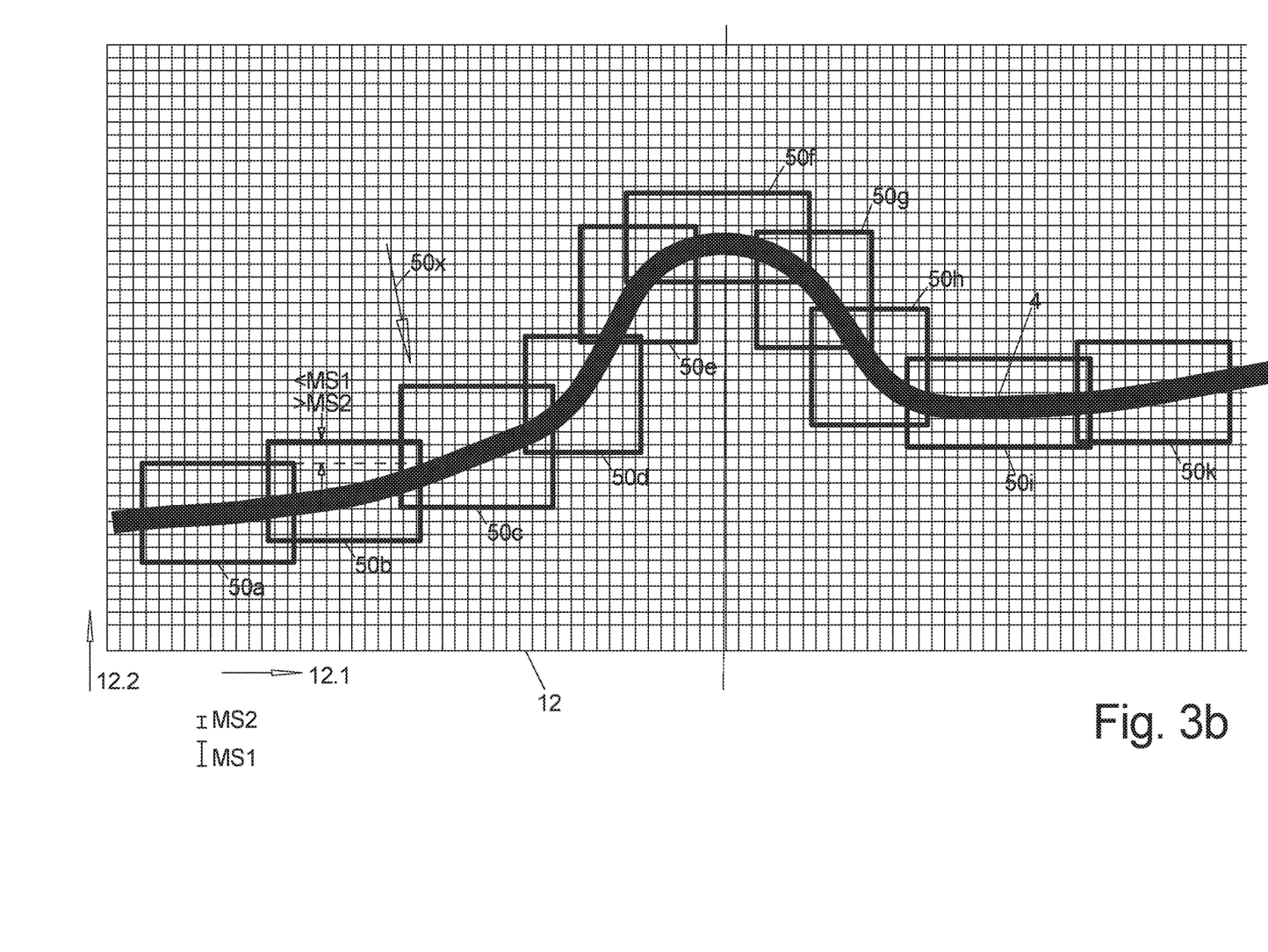
Figure 3C:
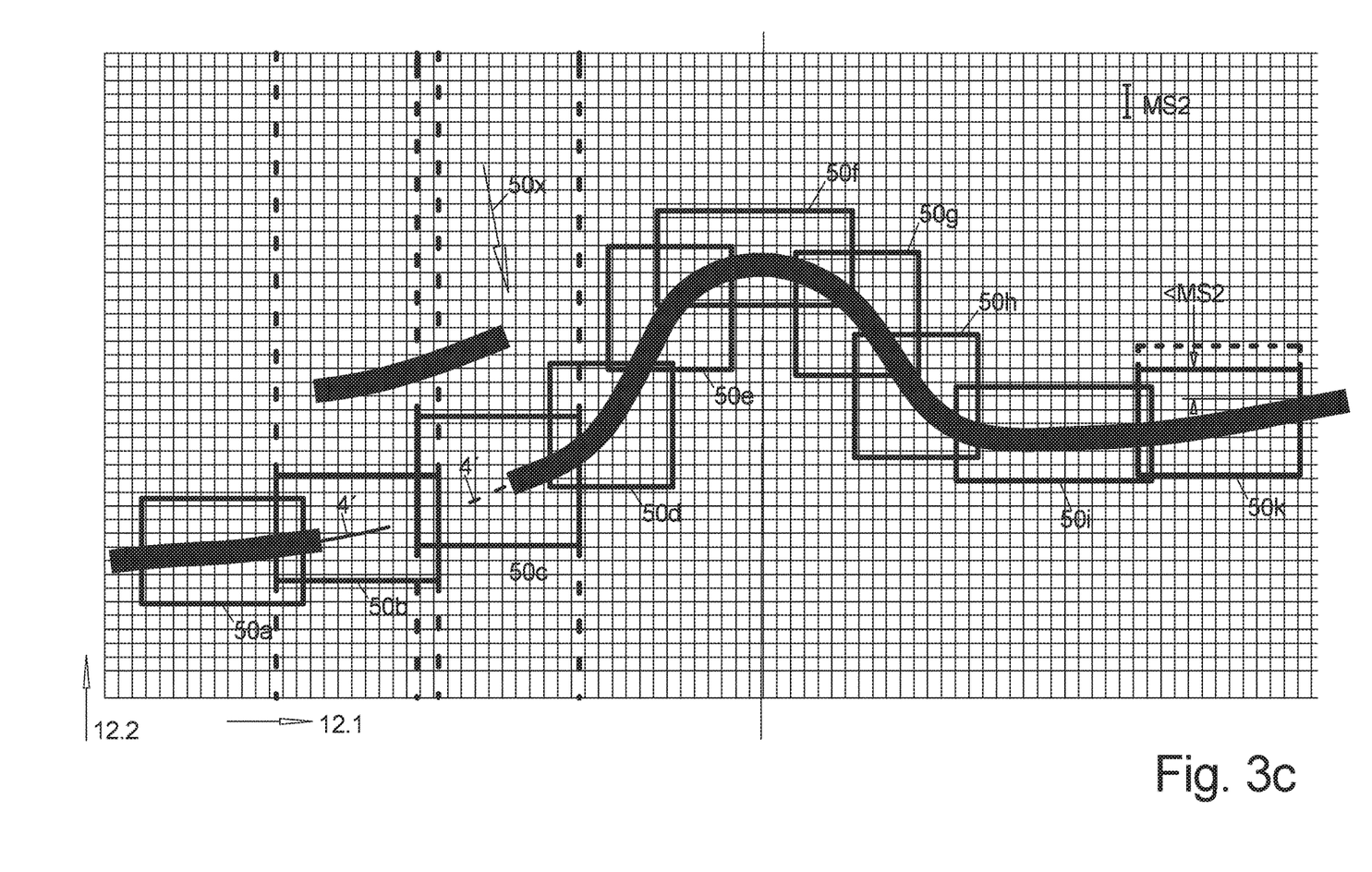

FIGS. 3a through 3c illustrate light line images which include pixels P1.1, P1.2 and P2.1 that are arranged on the flat, in this case rectangular sensor 12 in lines Z1, Z2 extending in a first main orientation and in rows R1, R2 arranged in a second orientation 1.2.2 extending at a right angle to the first main orientation.

FIG. 3b shows the basic idea namely not to read brightness values of all pixels on the entire sensor 12 to capture and process the line image 4 and to process them further in an electronic processing unit but merely the pixels from the previously predetermined windows 50a, 50b which however in total yield a window portion 50* which includes an entirety of the line image 4. For this purpose, the individual windows 50a, 50b have to at least touch each other, advantageously overlap with each other.

Thus, there is the problem that the position of the line image on the sensor 12 has to be known at least within a broad range in order to be able to define a size and position of the windows 50a, 50b which has to be performed for most configurations of sensors 12 before a beginning of a respective scan for all windows 50a, 50b.

In order to perform this position determination a measuring scan with reduced resolution is performed before the measuring scan with the necessary, typically full resolution of the sensor 12 in order obtain a contour determination of the surface contour 2' that is as precise as possible, wherein data of the reduced resolution measuring scan is not included in the resultant data.

During the position scan the entire surface of the sensor 12 is processed since illuminated surfaces on the sensor can also be arranged remote from the expected line image 4 as illustrated, e.g., in FIG. 3c.

However, brightness values of all pixels P1.1 of the sensor 12 are advantageously not read for this position scan but only a reduced number.

Thus e.g., in each main orientation 12.1, 12.2 of the sensor starting with a first pixel only a fifth or tenth pixel or another integer multiple of the pixels can be read or processed.

Figure 4A:
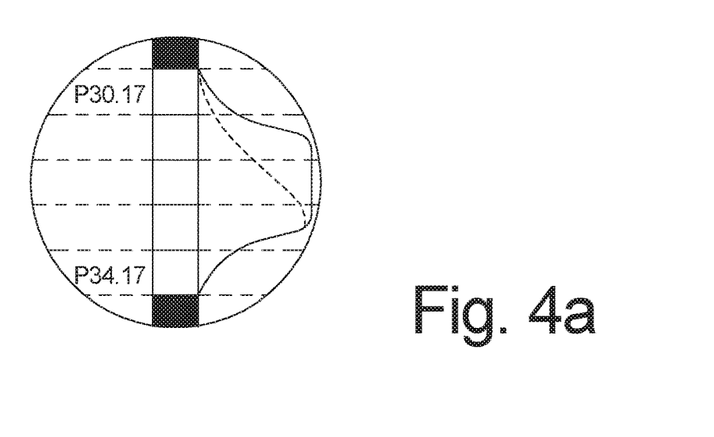
FIG. 4a illustrates a detail enlargement of the line image in the transversal direction.
Figure 4B:
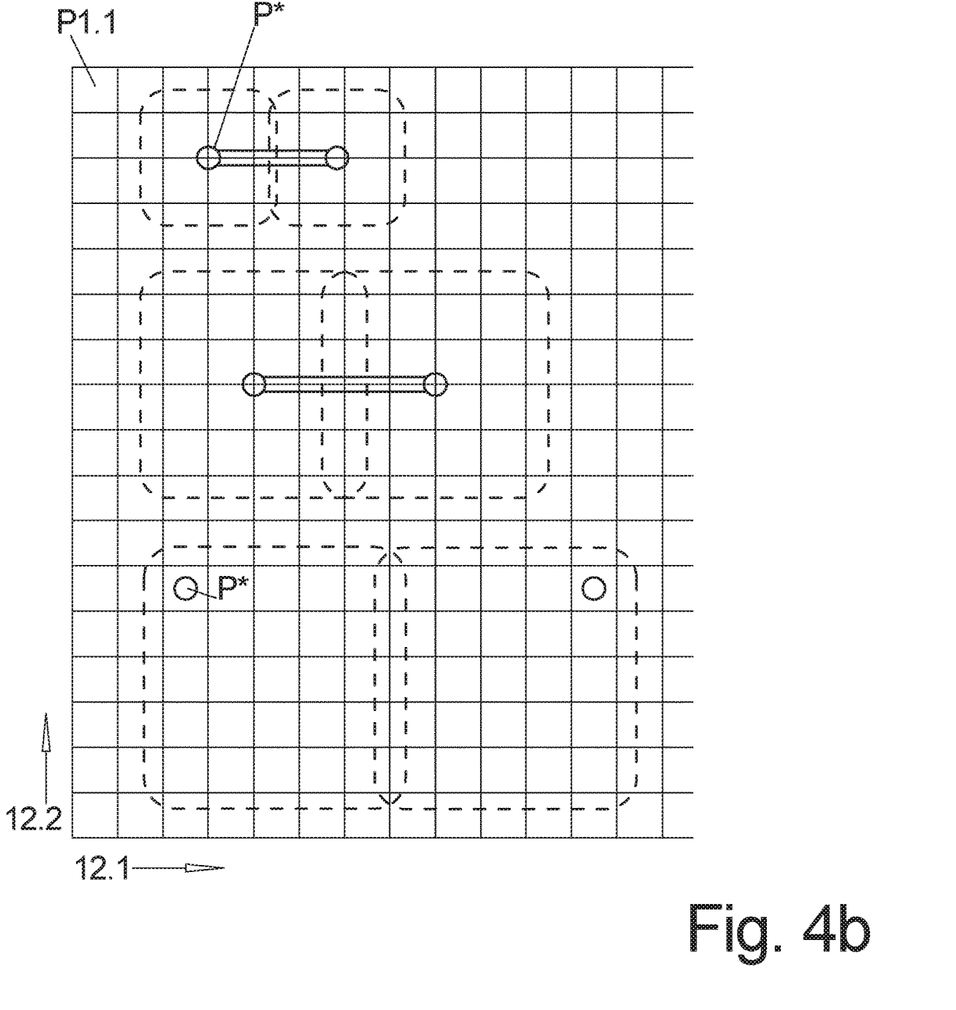
FIG. 4b illustrates a determination of virtual pixels on the flat sensor.

Another method is illustrated in FIG. 4b thus for a respectively predetermined pixel group e.g., 4 pixels that are arranged in a square or 16 pixels that are arranged in a square, can be combined with respect to their brightness values already during reading and during reading to form a single virtual pixel P*, wherein the groups advantageously adjoin seamlessly in both extension directions 12.1, 12.2 or overlap slightly in a defined manner.

Thereafter only brightness values of the virtual pixels P* are being considered which are computed according to a predetermined algorithm from brightness values of the pixels of this pixel group, e.g., as a mean or sum of the brightness values of the pixels of this pixel group.

The virtual pixels 50* which have a brightness value above a predetermined threshold value are presumed to be located in the portion of the line image 4.

In order to obtain a continuous coarse outline of the line image 4 the virtual pixels P* that are offset from each other can be computationally connected by straight lines so that this polygonal section represents the coarse outline of the line image 4 on the sensor 12 based on which a position and size of the window 50a, 50b can be defined for the subsequent measuring scan.

It is illustrated in the lower portion of FIG. 4b how the virtual pixel P* is determined instead for a predetermined group of pixels thus 25 pixels arranged in a square wherein the virtual pixel is the pixel which has the highest brightness value in the pixel group and only this pixel is processed as the virtual pixel 50* with a brightness value to determine the coarse position of the line image 4 e.g. as stated supra.

After determining the virtual pixels P* which were determined as illuminated and thus in the portion of the line image 4 about the virtual pixels, in a predetermined area, e.g., the 4 or 16 pixels that surround the virtual pixel so that the brightness values of each individual pixel are additionally determined again in order to additionally not only determine the orientation but, e.g., also the width of the line image 4.

In FIG. 4a an inverse cross-section from such line image 4 is illustrated which in this case has a width of 5 pixels, here P30.17 through P34.17.

Thus, at least at this location a width B of the light line image 4 is known and when determining a width at plural or even all locations along the light line the maximum and/or average width of the line image 4 can be determined.

In particular this line image 4 with an actual width B can be reduced to a width with only one pixel in that the brightness value of pixels adjoining in the transversal direction to the light line image 4 are combined into a transversal pixel either in that the pixel that has the highest brightness value in the transversal direction is selected as a transversal pixel, or in that simply the center pixel is selected, however, with a brightness value which is, e.g., averaged over the brightness value of all five pixels in the transversal direction.

A distribution of the brightness values of the pixels in the transversal direction is indicated into possible embodiments in FIG. 4a.

This way reducing to a single pixel in the width B of the line image 4 facilitates determining a very precise profile of the line image.

Very often a number of reading windows that can be predetermined is limited to a maximum number by the configuration of the sensor 12.

As illustrated in FIGS. 3a-c the line image 4 typically has a primary orientation in spite of its curvature, thus the main orientation 12.1 or 12.2 of the flat sensor 12 relative to which the orientation of the line image 4, thus a straight line from a beginning of the line image 4 to an end of the line 4 has the smaller intermediary angle.

In order to determine the lengths of the windows 50a1, 50a2 in the primary orientation of the line image 4, e.g., in the main orientation 12.1, the length of the sensor 12 in this main orientation 12.1 can be divided, e.g., according to FIG. 3a by the maximum number of the permissible windows which yields a primary partial length 12.1*.

Figure 5:
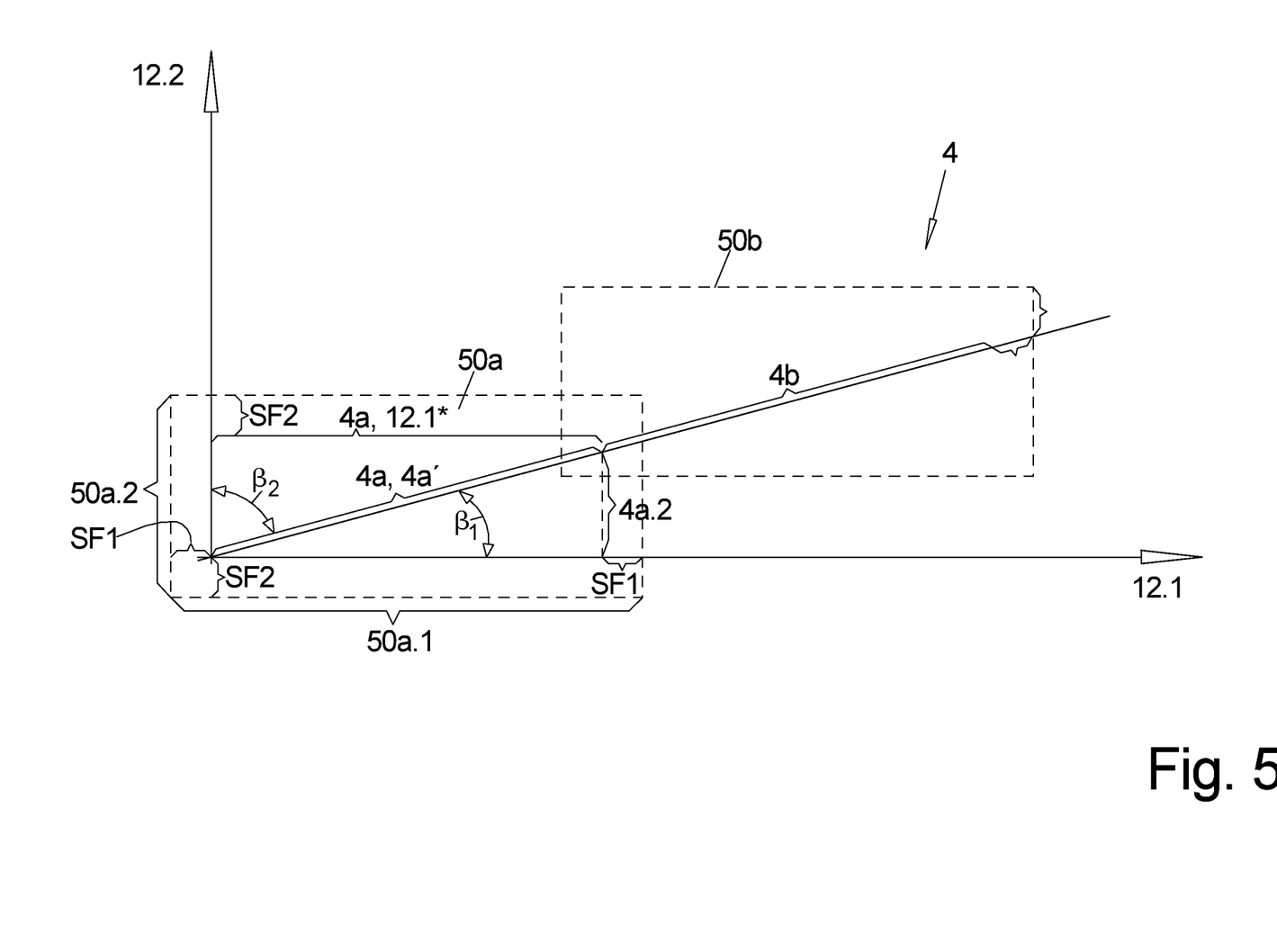
FIG. 5 illustrates a beginning of a line image.

On the one hand side, this facilitates dividing the line image 4 into sections 4a which have in this case respectively the same section length 4a1 in the main orientation 12.1 as evident from FIG. 5.

From the known orientation of the line image 4 thus the section length 4a2 can thus be determined in each section 4a in the other main orientation 12.2 of the sensor.

Thus, a respective window, e.g., 50a can be placed around the outline of the section 4a by increasing the primary partial length 12.1* which corresponds to the section length 4a1 in this direction on both sides respectively by a first safety margin SF1 and by increasing the section length 4a2 in the other extension direction 12.2 on both sides respectively by a second safety margin SF2 so that the window 50a with its window length 50a1, 50a2 is defined with respect to size and position.

This can be performed analogously for all sections for a of the line image 4 so that all windows 50a, 50b are defined.

For the subsequent measuring scan brightness values of all pixels in the windows 50a, b are read from the respective windows 50a, b, wherein pixels that are included in the overlap portion are only read once with respect to their brightness value and are considered during processing.

In case it becomes evident during the measuring scan that the line image 4 has a gap in its course as illustrated in FIG. 3c or even without a gap additional illuminated portions are provided remote from the line image 4 on the sensor 12, the following method is applied.

If the line image 4 has a gap as illustrated in FIG. 3c the windows 50b, 50c that include the gap are expanded in the transversal direction to the primary orientation 4' of the line image 4, a respective tangential direction in a particular point of the line image 4 as marked at edges of the gap wherein the tangential direction is the orientation 12.1 so that the windows are expanded in the orientation 12.2 to the entire width of the sensor 12 in this second orientation 12.2 in order to capture a portion of the line image 4 that may be transversally offset to the remaining line image 4. When a transversally offset portion of this type is not included in these expanded windows, the measuring scan is not being used and a new position scan is performed.

Another question is how often a position scan which always represents lost time for the actual measuring process has to be performed, thus whether a position scan has to be performed before each measuring scan or whether plural measuring scans can be performed in direct sequence one after another after a position scan.

For this purpose as illustrated in FIG. 3b it can be examined for each individual window 50a, b whether the section for a enveloped by the respective window keeps a sufficient minimum safety distance MS2 from the longitudinal edges of the surrounding window.

When this is the case for all windows 50a, b another measuring scan is performed with the same windows without previously performing a position scan.

If this is not the case the enveloping window is expanded in the corresponding direction at the respective spot where the minimum safety distance MS2 is not maintained, so that this second minimum safety distance MS2 is maintained and the next measuring scan is performed with the window thus adjusted and the window portion 50* thus adjusted.

Thus, a maximum size can be predetermined for the windows wherein the maximum size must not be exceeded, and a new position scan is performed when the maximum size is exceeded.

In order to exceed safety so that the entire line image 4 is captured during a measuring scan it can also be checked additionally before using the raw data of a measuring scan for further processing and before using the resultant data whether a typically smaller first minimum safety distance MS1 is maintained in particular along edges of a window e.g., 5a surrounding the respective section 4a in analogy to the method described supra.

REFERENCE NUMERALS AND DESIGNATIONS

1 Object
2 Surface

2' Surface contour
2a Convex
3 Light line
3' Light beam
4 Line image
4' Orientation
4a Section
4a1, 4a2 Section length
5, 5' Viewing direction
6 Detector arrangement
7 Movement direction
8 Extension
9 Image data memory
10 Individual image raw data
10' Individual image compact data
11 Electronic processing unit
12 Optical sensor
12.1, 12.2 Orientation
12.1* Primary section length
13a, b Parallel output
14 Laser light source
15 Internal memory
16 Housing
17 Radiation direction
18 Monitoring width
19 Mirror
20 Main plane
21 Orthogonal, orthogonal plane
22 Base surface
23 Passthrough
24 Circuit board
25 Intermediary storage
26 Plug
50a, b Window
50a1 Length
50a2 Length
50* Window portion
$\alpha$ Triangulation angle
$\alpha_1, \alpha_2$ Intermediary angle
$\beta 1, \beta 2$ Slope angle
P1.1 Pixel
P* Virtual pixel
D1.1 Data set
MS1, MS2 Safety distance
Z1 Line
R1 Row
S1, S2 Scan
SF1, SF2 Safety margin
b, B Width

The invention claimed is:

1. A method for touch free determination of surface data, of a surface contour of objects using a light section triangulation method, wherein
    a) at least one fanned light beam is oriented in a radiation direction onto a surface of the object,
    b) a viewing direction of a detector arrangement is arranged at a triangulation angle ($\alpha$) relative to the radiation direction of the light beam,
    c) a light line thus generated on the surface is captured by the detector arrangement which includes a flat optical sensor as a line image of the light line configured as an individual image and stored as individual image raw data of the light line,
    d) the individual image determination according to step c) is performed multiple times in sequence in a movement direction transverse to the orientation of the light line so that resultant data describing the entire surface contour is summed up from the individual image raw data of the light lines thus obtained,
characterized in that
    e) an individual image determination according to step c) with reduced resolution is performed as a position scan, wherein windows that overlap each other in an orientation of the line image are determined automatically on the sensor from a position and shape of the line image on the flat optical sensor that is known from the position scan so that the windows respectively include portions of the line image and a sum of the windows includes the entire line image,
    f) thereafter at least one individual image determination according to step c) with higher resolution than for the position scan is performed as a measuring scan, wherein only the window raw data is read from the windows and assembled into individual image raw data which corresponds to the entire line image on the sensor,
    g) only the individual image raw data of the measuring scan according to feature f) is used for determining resultant data according to step d) which describe the entire surface contour.

2. The method according to claim 1, characterized in that step e) includes
    e1) reading the individual image raw data of the entire flat optical sensor, wherein the individual image raw data thus reproduce at least the entire line image,
    e2) individual image compact data that includes a reduced data volume is generated from the individual image raw data, wherein the individual image compact data still reflects the position and configuration of the line image with lower precision.

3. The method according to claim 1, characterized in that the position scan reduces the resolution of the individual image compact data compared to the individual image raw data, in that
    the light values of a pixel group of directly adjacent pixels of the individual image raw data of 4 or 16 pixels that are adjacent to one another in a square are combined into a single virtual pixel (P*) as a portion of the individual image compact data with,
    either a position of the virtual pixel (P*) in a center of the combined pixel group, and
    a brightness value of the virtual pixel (P*) computed as a mean or sum of all pixels of the pixel group,
    or a position of the virtual pixel (P*) at a location of the pixel of the considered pixel group with the highest brightness value, and
    a brightness value of the virtual pixel (P*) corresponding to a brightness value of the brightest pixel of the pixel group,
    and the virtual pixels (P*) that are offset from each other form individual image compact data which reproduce the position and shape of the line image, wherein
    the gaps between virtual pixels (P*) that are adjacent to each other are used by straight connection lines as virtual portions of the line image.

4. The method according to claim 1, characterized in that determining the position and the brightness value of the virtual pixel is already performed in the analog portion, in the sensor even before reading the data from the sensor.

5. The method according to claim 1, characterized in that in each main orientation of the flat sensor respectively only every fifth pixel is read and used for the individual image compact data.

6. The method according to claim 1, characterized in that as a higher resolution of the measuring scan compared to the position scan
- either the full resolution of the individual image raw data is used, or
- a predetermined multiple of the lower resolution that is used for the position scan.

7. The method according to claim 1, characterized in that another position is scan is performed after each measuring scan.

8. The method according to claim 1, characterized in that
- checking is performed after each measuring scan whether the measuring scan has yielded a seamless line image, and if not,
- either performing another measuring scan, or
- expanding windows that include an entire gap of the image in one of the two main orientations of the sensor which is oriented primarily transverse to the orientation of the line image to an entire extension of the sensor in this main orientation and determining for this expanded window window raw data and checking whether the window raw data completely closes the gap and as a function thereof performing the next measuring scan or a new position scan.

9. The method according to claim 1, characterized in that the following steps are performed starting with the second measuring scan after a preceding position scan after performing the measuring scan:
- checking whether the captured line image has a predetermined first minimum safety distance at each location, transversal to the orientation of the line image, to the outer edges of the window portion generated from the overlapping windows,
- if yes, using the measuring scan,
- if no, discarding the measuring scan and performing a new position scan.

10. The method according to claim 1, characterized in that the following steps are performed after each measuring scan that has generated a complete line image:
- checking whether the determined line image has a predetermined second minimum safety distance (MS2), which is greater than the first minimum safety distance relative to the outer edges of the window portion generated by the overlapping windows, and
- if yes, using the windows used so far for the next measuring scan,
- if no, expanding a window positioned about the location of the line image for the next measuring scan at the location of the line image, so that the predetermined second minimum safety distance (MS2) is maintained and the window portion thus modified is used for the next measuring scan.

11. The method according to claim 1, characterized in that the windows are rectangular windows whose edges
- extend in the first main orientation and in the second main orientation of the flat sensor, and/or
- in the main orientation which is primarily oriented in a direction of a width (B) of the light line image an edge length of the window is a predetermined multiple of a width (B) of the light line image, at least five times of a width (b) the light line image.

12. The method according to claim 1, characterized in that for a predetermined maximum number of windows on the sensor a length of the sensor in the main orientation in which the line image extends primarily is divided by the maximum number and a primary partial length thus obtained in this main orientation is increased by a predetermined percentage and defined as average window length in this main orientation.

13. The method according to claim 1, characterized in that the windows are defined as follows:
- a section of the line image with a predetermined section length in the main orientation is determined with respect to its course on the sensor in that a slope angle ($\beta1$) and ($\beta2$) of this section relative to the first main extension of the sensor and the second main extension is determined and therefrom an extension of the section is determined in the two main extensions,
- in a main orientation relative to which a slope angle ($\beta1$) is less than another slope angle ($\beta2$) a window completely enclosing the section is defined so that
- the edge length of the window is selected in the first main orientation greater by twice a safety margin (SF1) than the extension of the section in this main orientation,
- the edge length of the window (50a) in the second main orientation is selected greater by twice a safety margin (SF2) than the extension of the section in the other main orientation.

14. The method according to claim 1, characterized in that
- a primary partial length of a window is selected as a predetermined section length of the section or a length corresponding to a concatenation of a predetermined number of pixels of the sensor is selected as a predetermined section length of the section.

15. A device adapted to perform the method according to claim 1, the device comprising:
- a laser light source,
- a detector arrangement with a flat optical sensor with pixels advantageously arranged in a matrix form and an electronic processing unit configured to provide image data processing and computation of resultant data, characterized in that
- the optical sensor is configured so that determining windows from which measuring data is to be read is required before performing the respective scan.

16. The device according to claim 15, characterized in that the optical sensor includes an internal data memory and in particular an internal preprocessing unit for the data in the internal data memory.

* * * * *